United States Patent
Huang et al.

(10) Patent No.: US 12,226,816 B2
(45) Date of Patent: Feb. 18, 2025

(54) SYSTEMS AND METHODS FOR SPINGBACK COMPENSATION IN BEND FORMING PROCESSES

(71) Applicant: GM GLOBAL TECHNOLOGY OPERATIONS LLC, Detroit, MI (US)

(72) Inventors: Lu Huang, Troy, MI (US); Hui-ping Wang, Troy, MI (US); Bradley J Blaski, Sterling Heights, MI (US); Joshua Lee Solomon, Berkley, MI (US); Blair E Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 599 days.

(21) Appl. No.: 17/647,516

(22) Filed: Jan. 10, 2022

(65) Prior Publication Data
US 2023/0219126 A1    Jul. 13, 2023

(51) Int. Cl.
*B21D 5/00* (2006.01)
*B21D 5/02* (2006.01)

(52) U.S. Cl.
CPC ............. *B21D 5/004* (2013.01); *B21D 5/006* (2013.01); *B21D 5/02* (2013.01); *G05B 2219/37406* (2013.01); *G05B 2219/45143* (2013.01)

(58) Field of Classification Search
CPC .......... B21D 5/004; B21D 5/006; B21D 5/02; G05B 19/4097; G05B 2219/37403; G05B 2219/37406; G05B 2219/45143
See application file for complete search history.

(56) References Cited

U.S. PATENT DOCUMENTS

| | | | | |
|---|---|---|---|---|
| 4,627,255 | A | * 12/1986 | Archer | B21D 5/042 72/702 |
| 5,992,210 | A | * 11/1999 | Blurton-Jones | B21D 7/14 72/16.1 |
| 2016/0288184 | A1 | * 10/2016 | Zhao | B21D 5/02 |
| 2021/0086245 | A1 | * 3/2021 | Guernsey | B21D 5/02 |

* cited by examiner

*Primary Examiner* — Tameem D Siddiquee
(74) *Attorney, Agent, or Firm* — Lorenz & Kopf LLP

(57) ABSTRACT

Systems and methods for bending a material to a target resultant bending parameter using a bend forming tool are disclosed. The systems and methods receive values for parameters of properties of the material and of a bending process to be performed by the bend forming tool, creating or retrieving a calibration curve relating input bending parameter and resultant bending parameter based on the values from a database of calibration curves, determining a first springback compensated input bending parameter based on the target resultant bending parameter using the calibration curve, inputting the first springback compensated input bending parameter to the bend forming tool, and in a first step of bending the material, bending the material to the first springback compensated input bending parameter by applying the bending process using the bend forming tool.

14 Claims, 7 Drawing Sheets

SYSTEMS AND METHODS FOR SPINGBACK COMPENSATION IN BEND FORMING PROCESSES

TECHNICAL FIELD

The present disclosure generally relates to systems and methods associated with bend forming processes, and more particularly relates to systems and methods for springback compensation in bend forming processes.

A bend forming tool is a machine that forms a bend in a material to achieve a target bend angle (and other bend parameters). One exemplary bend forming tool is a press brake. After the bending pressure from the bend forming tool is released, elastic materials (such as sheet metal) will recover, resulting in a phenomenon called springback. The resultant bend angle (and other bending parameters) may, therefore, not match the input target bend angle. In order to compensate for the springback in the material, an operative may have to go through trial and error bending iterations using the bend forming tool in order to achieve the target bending angle. This process is time consuming, can result in waste material and requires skilled operatives.

Accordingly, it is desirable to provide systems and methods that assist in consistently and accurately achieving springback compensation in a minimal number of bending operations. Furthermore, other desirable features and characteristics of the present invention will become apparent from the subsequent detailed description and the appended claims, taken in conjunction with the accompanying drawings and the foregoing technical field and background.

SUMMARY

In one aspect, a method is provided of bending a material to a target resultant bending parameter using a bend forming tool. The method includes receiving, via at least one processor, values for parameters of properties of the material and of a bending process to be performed by the bend forming tool, retrieving, via the at least one processor, a calibration curve relating input bending parameter and resultant bending parameter based on the values from a database of calibration curves, wherein the calibration curve is configured to compensate for differences between input bending parameters and resultant bending parameters as a result of springback of the material, after bending of the material, due to material properties of the material, determining, via the at least one processor, a first springback compensated input bending parameter based on the target resultant bending parameter using the calibration curve, inputting the first springback compensated input bending parameter to the bend forming tool, and in a first step of bending the material, bending the material to the first springback compensated input bending parameter by applying the bending process using the bend forming tool.

In embodiments, the method includes determining the first springback compensated input bending parameter based on the target resultant bending parameter using the calibration curve comprises calculating a difference between the target resultant bending parameter and a calibration curve springback compensated input bending parameter that corresponds to the target resultant bending parameter according to the calibration curve and adding a fraction of the difference to the calibration curve springback compensated input bending parameter to obtain the first springback compensated input bending parameter.

In embodiments, the method includes measuring a first measured resultant bending parameter of a bend created by the first step of bending the material after allowing springback of the material. The measuring may be performed by an automated bending parameter measurement device of the bend forming tool or by a manual bending parameter measurement device.

In embodiments, the method includes determining, via the at least one processor, a deviation between the first measured resultant bending parameter and an expected resultant bending parameter that corresponds to the first springback compensated input bending parameter according to the calibration curve, offsetting the calibration curve based on the deviation to provide an offset calibration curve, determining, via the at least one processor, a second springback compensated input bending parameter based on the target resultant bending parameter using the offset calibration curve, inputting the second springback compensated input bending parameter to the bend forming tool, and in a second step of bending the material, bending the material to the second springback compensated input bending parameter by applying the bending process using the bend forming tool.

In embodiments, the method includes recording, via the at least one processor, the first springback compensated input bending parameter and the first measured resultant bending parameter for each of a plurality of executions of the method of bending a material to provide M new calibration data points, wherein M is determined based on a function used for best curve fitting (e.g., M may be at least 4 for a cubic polynomial function), and generating a new calibration curve based on the M new data points, wherein the new calibration curve is to be used as the calibration curve in subsequent executions of the method of bending a material. In embodiments, the new calibration curve is generated based on the function for best curve fitting.

In embodiments, the method comprises determining, via the at least one processor, whether the database of calibration curves includes the calibration curve that corresponds to the values and, if not: the method further comprises: bending the material to M different input bending parameters by applying the bending process using the bend forming tool and measuring the resultant bending parameters, wherein M is determined based on a function used for best curve fitting (e.g., M may be at least 4 for a cubic polynomial function); plotting the calibration curve based on the input bending parameters and the resultant bending parameters; and recording the calibration curve in the database of calibration curves in association with the values.

In embodiments, the method includes receiving, via the at least one processor, the target resultant bending parameter from a user input device.

In embodiments, the target bending parameter is plunging distance, force of punch or bend angle.

In embodiments, the bend forming tool is a press brake.

In embodiments, the method includes receiving, via the at least one processor, a first measured resultant bending parameter of a bend created by the first step of bending the material, determining whether the first measured resultant bending parameter falls within predetermined tolerance limits, if the first measured resultant bending parameter falls within predetermined tolerance limits, then the being process is complete, if the first measured resultant being parameter falls outside the predetermined tolerance limits, the method includes discarding the material if the first measured resultant being parameter exhibits an overbend; and if the first measured resultant bending parameter exhibits an underbend, then the method further includes: determining, via the at least one processor, a deviation between the first measured resultant bending parameter and an expected resultant bending parameter that corresponds to the first springback compensated input bending parameter according to the calibration curve, offsetting the calibration curve based on the deviation to provide an offset calibration curve, determining, via the at least one processor, a second springback compensated input bending parameter based on the target resultant bending parameter using the offset calibration curve, inputting the second springback compensated input bending parameter to the bend forming tool, and in a second step of bending the material, bending the material to the second springback compensated input bending parameter by applying the bending process using the bend forming tool.

In another aspect, a system is provided for bending a material to a target resultant bending parameter. The system includes a bend forming tool, at least one processor in operable communication with the bend forming tool. The at least one processor is configured to execute program instructions. The program instructions are configured to cause the at least one processor to: receive values for parameters of properties of the material and of a bending process to be performed by the bend forming tool, retrieve a calibration curve relating input bending parameter and resultant bending parameter based on the values from a database of calibration curves, wherein the calibration curve is configured to compensate for differences between input bending parameters and resultant bending parameters as a result of springback of the material, after bending of the material, due material properties of the material, determine a first springback compensated input bending parameter based on the target resultant bending parameter using the calibration curve, and in a first step of bending the material, bend the material to the first springback compensated input bending parameter by applying the bending process using the bend forming tool.

In embodiments, the program instructions are configured to cause the at least one processor to: determine the first springback compensated input bending parameter by calculating a difference between the target resultant bending parameter and a calibration curve springback compensated input bending parameter that corresponds to the target resultant bending parameter according to the calibration curve and adding a fraction of the difference to the calibration curve springback compensated input bending parameter to obtain the first springback compensated input bending parameter.

In embodiments, the program instructions are configured to cause the at least one processor to: receive a first measured resultant bending parameter of a bend created by the first step of bending the material after allowing springback of the material.

In embodiments, the program instructions are configured to cause the at least one processor to: determine a deviation between the first measured resultant bending parameter and an expected resultant bending parameter that corresponds to the first springback compensated input bending parameter according to the calibration curve, offset the calibration curve based on the deviation to provide an offset calibration curve, determine a second springback compensated input bending parameter based on the target resultant bending parameter using the offset calibration curve, and in a second step of bending the material, bend the material to the second springback compensated input bending parameter by applying the bending process using the bend forming tool.

In embodiments, the program instructions are configured to cause the at least one processor to: record the first springback compensated input bending parameter and the first measured resultant bending parameter for each of a plurality of executions of bending a material by applying the bending process using the bend forming tool, to provide M new calibration data points, wherein M is determined based on a function used for best curve fitting (e.g., M may be at least 4 for a cubic polynomial function), and generate a new calibration curve based on the M new data points, wherein the new calibration curve is to be used as the calibration curve in subsequent executions of bending a material by applying the bending process using the bend forming tool.

In embodiments, the program instructions are configured to cause the at least one processor to: determine whether the database of calibration curves includes the calibration curve that corresponds to the values and, if not: bend the material to M different input bending parameters by applying the bending process using the bend forming tool and measuring the resultant bending parameters, wherein M is determined based on a function used for best curve fitting (e.g., M may be at least 4 for a cubic polynomial function), plot the calibration curve based on the input bending parameters and the resultant bending parameters, and record the calibration curve in the database of calibration curves in association with the values.

In embodiments, the program instructions are configured to cause the at least one processor to: receive the target resultant bending parameter from a user input device.

In embodiments, the target bending parameter is plunging distance, force of punch or bend angle.

In embodiments, the bend forming tool is a press brake.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
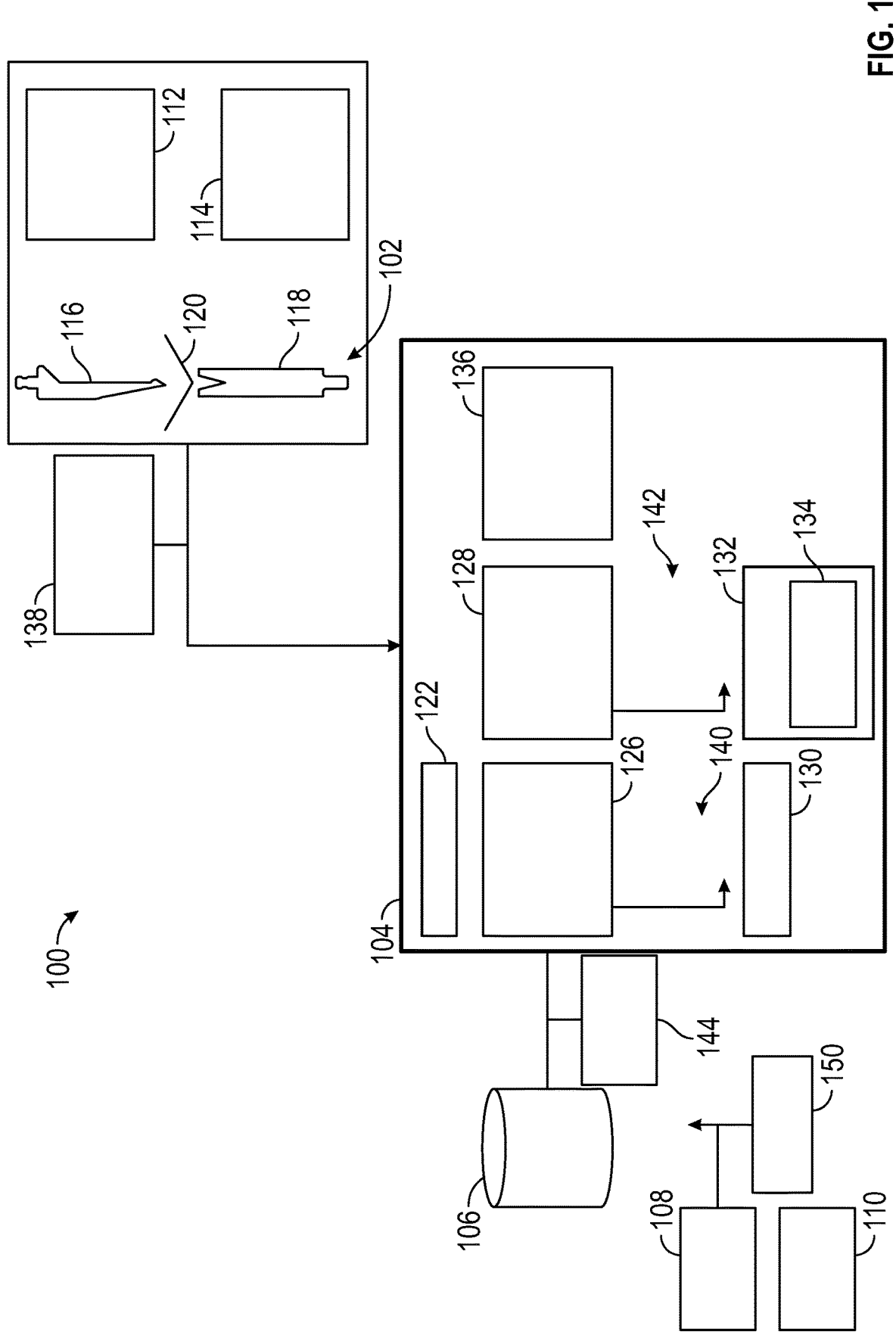
FIG. 1 is a functional block diagram of a system for springback compensation in bend forming processes, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The present disclosure provides systems and methods for springback compensation based on a calibrated material response curve. The springback compensation system includes a database of calibration curves. Each calibration curve defines a relationship between machine input bending parameter (such as target angle) and resultant bending parameter. The calibration curves are specific to particular bending processes and materials. The present disclosure provides for one-step compensation based on the calibration curve and two-step compensation which uses a self-correction algorithm to account for process variations. The systems and methods described herein account for the material and process variations in the bending process and enables corrective feedback for real-time calibration.

With reference to FIG. 1, a system for springback compensation in bend forming processes is shown generally at 100. The system 100 includes a bend forming tool 102, a processing system 104, a database of calibration curves 106, a user input device 108 and a user output device 110. The bend forming tool 102 is configured to bend a material 120 to one or more target input bend parameters such as bend angle, plunging distance and/or force of punch. The present disclosure will be described primarily in terms of bend angle but the systems and methods disclosed herein are also applicable to other target bending parameters. In one embodiment, the bend forming tool 102 is a press brake, which is a machine pressing tool for bending the material 120 such as sheet and plate material, e.g. sheet and plate metal. The bend forming tool 102 forms defined bends by clamping the material 120 between a matching punch 116 and die 118. The bend forming tool 102 may apply mechanical, pneumatic, hydraulic, or servo-electric force. The bend forming tool 102 may include a back gauge, which is a device that can be used to accurately position the material 120 so that the bend forming tool 102 puts the bend in the correct place. Furthermore, the back gauge can be programmed to move between bends to repeatedly make complex parts. The bend forming tool 102 includes a resultant bend angle measurement device 112 in some embodiments. The resultant bend angle measurement device 112 may include optical sensors that send real-time data to a control module 114 about the bending angle in the bend cycle. The control module 114 may adjust process parameters based on the real-time data. However, the optical sensors may not always be effective as they rely on a laser (or other optical source) having access to the bend, which may not be the case where, for example, there are cut out holes or other features on a flange created by the bend. Accordingly, a more universally applicable way of achieving a target bend parameter is desirable. In other embodiments, the resultant bend angle is measured using a manually operated device such as a protractor. The control module 114 is configured to control operation of the bend forming tool 102 including force, compression stroke length, bend angle, back gauge position, etc. The control module 114 receives target bending parameters from a user input device 108, in some embodiments. The user input device 108 may or may not be physically integrated with the bend forming tool 102.

In embodiments, the user input device 108 allows a user to define values for the material 120 and the bending process to be performed by the bend forming tool 102. The user input device 108 may be a virtual or physical keyboard and may be provided as a standalone unit (e.g. a laptop, tablet, computer, etc.) or as part of an interface panel of the bend forming tool 102. Exemplary parameters of the material include material type (e.g. 340HSLA Steel), any coating, material thickness, piece geometry (e.g. 50 mm*150 mm), etc. Exemplary parameters of the bending process include punch and die characteristics such as punch radius, punch length, die radius, die length, die width and die angle. Further parameters of the bending process include bend length and target bend angle. As described further above, target plunging distance and/or punch force may also be controlled by the systems and methods described herein. A user output device 110 may also be provided to display bending parameters calculated by the processing system 104. The user output device 110 may be provided as part of the same unit (e.g. laptop, table, computer, etc.) as the user input device 108 or may be part of a user interface panel of the bend forming tool 102. In some embodiments, bending parameters calculated by the processing system 104 may be sent directly to the bend forming tool 102 by the processing system 104 without being displayed to the user.

In embodiments, the processing system 104 is configured to create new, and retrieve existing, calibration curves and to calculate target bending parameters for input to the bend forming tool 102. The target input bending parameters have been adjusted for springback compensation using the calibration curves. The processing system 104 includes a calibration module 122, a one-step springback compensation module 126, a two-step springback compensation module 128, a bending process control module 136, a processor 130, memory 132 and computer programs 134.

Although a single processor 130 is illustrated, more than one processor may be provided. The processor 130 can be any custom made or commercially available processor, a central processing unit (CPU), a graphics processing unit (GPU), an auxiliary processor among several processors associated with the processing system 104, a semiconductor based microprocessor (in the form of a microchip or chip set), a macroprocessor, any combination thereof, or generally any device for executing instructions. The memory 132 may be any computer readable storage device or media and may include volatile and nonvolatile storage in read-only memory (ROM), random-access memory (RAM), and keep-alive memory (KAM), for example. KAM is a persistent or non-volatile memory that may be used to store various operating variables while the processor 130 is powered down. The memory 132 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processing system 104.

The computer programs embody computer readable instructions, each of which comprises an ordered listing of executable instructions for implementing logical functions. The instructions, when executed by the processor 130, calculate, from a target resultant bending parameter, a springback compensated input bending parameter that will achieve the target resultant bending parameter after elastic springback of the material 120 by using a calibration curve. The processing system 104 may and generate input signals to the bend forming tool 102 based on the calculated bending parameter. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Generally, the various modules 122, 126, 128, 136 are embodied in the computer programs and are executed by the processor 130 performing the logic, algorithms and calculations defined thereby.

In embodiments, the calibration module 122 receives parameter values 150 defining the material 120 and the desired bending process. The parameter values 150 may be received from user entry through the user input device 108 or may be otherwise received such as by automated reading. The calibration module 122 manages creation of calibration curves and retrieval of existing calibration curves. The calibration module 122 has access to a database of calibration curves 106. The database of calibration curves 106 stores a calibration curve in association with parameter values. Each calibration curve in the database of calibration curves 106 is associated with a specific set of values for material properties and bending processes. The calibration curves define a relationship between bending parameter input to the bend forming tool 102 and resultant bending parameter after springback.

Figure 2:
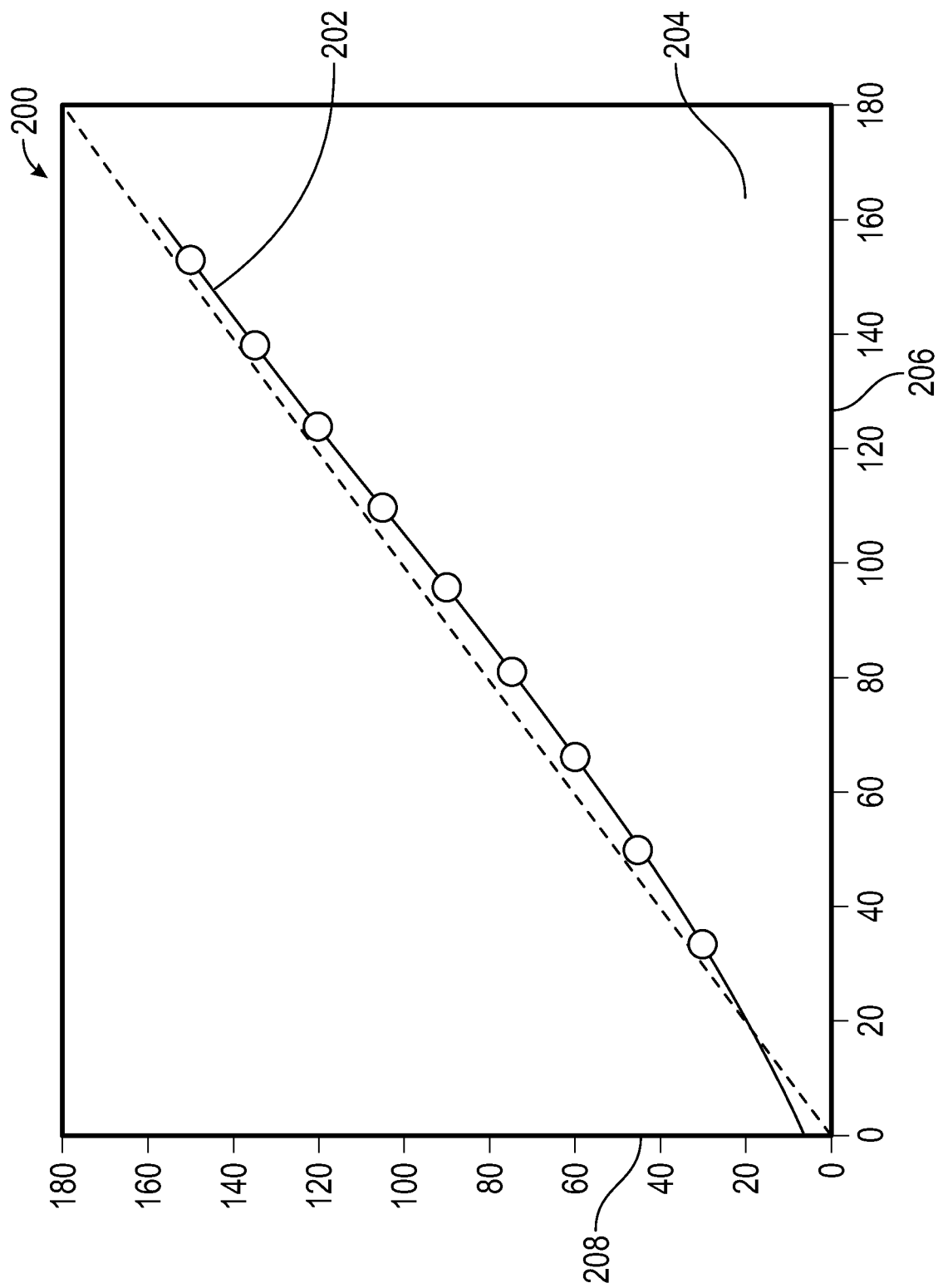
FIG. 2 illustrates a graph of input angle to resultant angle, in accordance with various embodiments.

With reference to FIG. 2, a graph 200 of input angle to resultant angle is illustrated. In the present embodiment, input angle is plotted on the y-axis and resultant angle is plotted on the x-axis. Bending angle is taken as an exemplary bending parameter in the present case. A calibration curve 202 is shown that plots 8 points (although this number of points can be varied and at least 4 data points should be present) representing different input angles distributed roughly evenly between 30° and 150° (although other ranges can be used) and the resultant angles measured after bend forming and springback. The calibration curve 202 is created by bending test materials (with defined material parameter values) according to a certain bending process (with defined bending process parameter values) to different input angles entered into the bend forming tool 102. The resultant angle is measured either by manual use of an angle measuring device or by machine measuring using the resultant bend angle measurement device 112. The pairs of input angle and resultant angle are plotted in order to generate a calibration curve 202. The calibration curve 202 may be represented graphically or by a calibration function 204. In the example of FIG. 2, the calibration function is in the form of a cubic polynomial, although other curve fitting equations can be used. The calibration curve 202 can be used by the processing system 104 to obtain an input angle that will achieve a particular target resultant angle. Each created calibration curve 202 is stored in the database of calibration curves 106 in association with the defined material parameter values and the defined process parameter values and usually in the form of the calibration function 204.

In various embodiments, the calibration module 122 determines whether a calibration curve 202 according to the defined material properties and bending processes is present in the database of calibration curves 106. The calibration module 122 looks up the parameter values 150 of the defined material properties and bending processes in the database of calibration curves 106 and the database of calibration curves 106 returns calibration curve data 144 if there is a corresponding calibration curve found. The calibration curve data 144 defines the calibration curve 202. If no corresponding calibration curve is found, a process is instigated through the user output device 110 prompting creation of a new calibration curve and entry of the data points via the user input device 108. In further embodiments, the calibration module 122 records values for input bending parameter and resultant bending parameter that are acquired during the two-step springback compensation process to be described further below. Once a sufficient number of values have been recorded (e.g. at least 4 data points), a new calibration curve can be created. In this way, the processing system 104 machine learns new calibration curve information so as to take into account process and material variations during use. In other embodiments, the calibration module 122 includes a machine learning module (not shown) that creates a calibration curve when no corresponding calibration curve is found in the database of calibration curves 106. The machine learning module can include a machine learning model that is trained based on material variables and process variables as an input and calibration curves as an output. The material variables and process variables are included in the database of calibration curves 106 along with the calibration curve data 144, thereby allowing the machine learning model to draw inferences as to the most probable fitting calibration curve when an input vector of material variable and process variables are provided that are not found in the database of calibration curves 106. Exemplary material variables include Grade, Coating, Thickness, Yield Strength (YS), Ultimate Tensile Strength (UTS), Elastic Modulus, Uniform Elongation (UE), Total Elongation (TE), n-value, R-value, etc. Exemplary process variables include Coefficient of friction, Tooling geometries (i.e., punch radius, punch length, die radius, die length, die width, die angle), forming speed, coupon/part dimension, etc.

Figure 4:
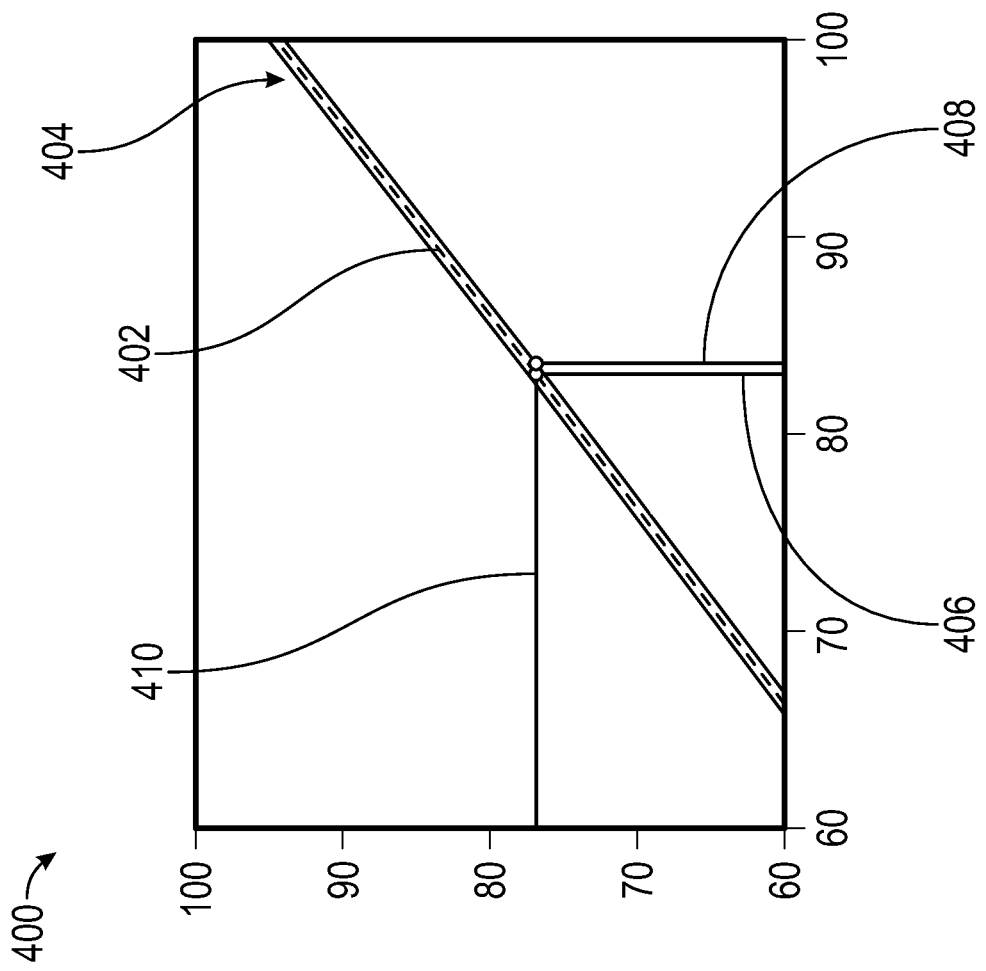
FIG. 4 is a graph showing input angle versus resultant angle in a one-step springback compensation process, in accordance with various embodiments.
Figure 3:
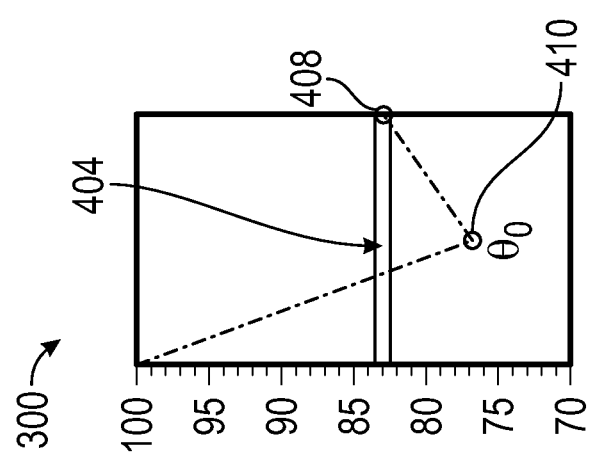
FIG. 3 is a graph showing a one-step springback compensation process, in accordance with various embodiments.

In embodiments, the one-step springback compensation module 126 receives a target bending parameter (e.g. target bending angle), which is usually entered by a user through the user input device 108. The target bending parameter can be found in the calibration curve (along the resultant bending parameter axis) and the corresponding input bending parameter defined by the calibration curve can be used as an input to the bend forming tool 102. In the example graph 400 of FIG. 4, the target resultant angle 406 is 83°, which, according to the calibration curve 402, corresponds to a first springback compensated input angle 410 of 76.9°. That is, according to the calibration curve 402, the bend forming tool 102 being set to bend the material 120 to an angle of 76.9° is expected to result in a bend angle of 83° after the material 120 elastically rebounds by 6.1°. In the example given, the actual measured resultant angle (the first measured resultant angle 408) is 83.4°, which is within the resultant angle tolerance 404 of 0.5° (which is an adjustable parameter). The bending sequence is further illustrated in the bending sequence graph 300 of FIG. 3. The one-step springback compensation module 126 determines that a first springback compensated input angle 410 is required in order to achieve the target resultant angle 406 according to the retrieved calibration curve 402. The first springback compensated input angle 410 is output from the one-step springback compensation module 126 in the form of one-step input angle data 140 and is entered to the bend forming tool 102. The one-step input angle data 140 may be provided to the user output device 110 for display and subsequent entry into the bend forming tool 102 via the user input device 108 or may be transmitted directly to the bend forming tool 102 by wired or wireless connection. After springback of the bent material 120 and measurement of the bend angle created by the bend forming tool 102, it is determined that the first measured resultant angle 408 is within the resultant angle tolerance 404 such that the material 120 has been bent to sufficiently achieve the target resultant angle 406 in a single bending operation.

In accordance with various embodiments, the two-step springback compensation module 128 calculates, again using a retrieved calibration curve, two springback compensated input bending parameters in order to achieve the target resultant bending parameter. The two-step springback compensation module 128 relies on an intermediate step of measuring the resultant bending parameter from a first bending process, which measured bending parameter is then used to adjust the calibration curve. The second input bending parameter is determined from the adjusted calibration curve. In the following, the two-step springback compensation module 128 is described with respect to an example where the bending parameter is bend angle. However, the processes described can be applied to other bending parameters.

Figure 6:
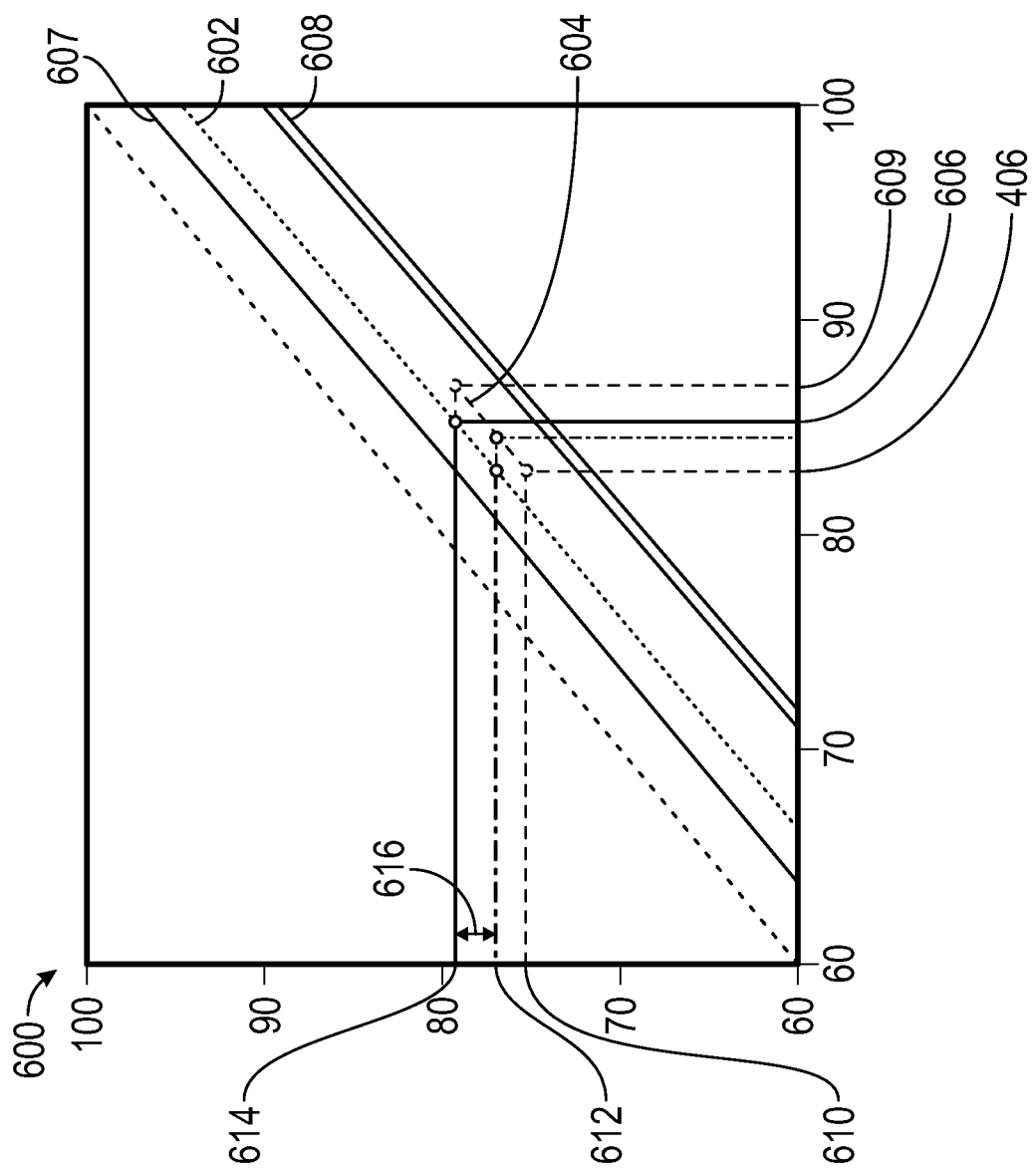
FIG. 6 is a graph showing input angle versus resultant angle in a two-step springback compensation process, in accordance with various embodiments.

In accordance with various embodiments, the two-step springback compensation module 128 receives a target resultant angle 406, usually via the user input device 108. The two-step spring compensation module 128 further retrieves a calibration curve 602 (see FIG. 6) from the database of calibration curves 106 that corresponds to input values of parameters defining both properties of the material 120 and the bending process to be performed by the bend forming tool 102. With reference to FIG. 6, the two-step springback compensation module 128 determines a first springback compensated input angle 614, which is an input angle that aims to bend the material 120 only part way to the target resultant angle 406. This calculation is performed by finding a calibration curve springback compensated input angle 612 that corresponds to the target resultant angle 406, which will be referred to as $\theta_0$ in the following equation 1. The calibration curve springback compensated input angle 612 actually corresponds to the first springback compensated input angle 410 of FIG. 4 under the one-step bending process. A fraction 616 (referred to as $\beta$ in equation 1) of the difference between the target resultant angle (referred to as $\theta_5$ in equation 1) is calculated and added to the calibration curve springback compensated input angle 612 to determine the first springback compensated input angle 614 (referred to as $\theta_1$ in equation 1). The first springback compensated input angle 614 is thus calculated as follows:

$$\theta_1 = \theta_0 + (\beta(\theta_5 - \theta_0)) \quad \text{(equation 1)}$$

$\beta$ is a calibratable constant that can be selected in the range of 0.1 to 0.9. An exemplary value for $\beta$ is 0.4 (i.e. a fraction of 40%). In the example of FIG. 6, the target resultant angle 406 is 83°, $\beta$ is 0.4 and the calibration curve springback compensated input angle 612 is 76.9°, which results in a first springback compensated input angle 614 of 79.3°.

Continuing to refer to the example of FIG. 6, the first springback compensated input angle 614 underbends the material 120 as compared to the full input angle (the calibration curve springback compensated input angle 612) required to achieve the target resultant angle 406 according to the calibration curve 602. The two-step springback compensation module 128 receives a first measured resultant angle 609, which is an angle of bend, after springback, created by the underbend applied by the bend forming tool 102. The first measured resultant angle 609 may be obtained by manual measurement and entry by an operative through the user input device 108 or by automated measurement, and communication, through a resultant bend angle measurement device 112. The two-step springback compensation module 128 determines a difference between an expected resultant angle 606 according to the calibration curve 602 and the first measured resultant angle 609. In the example of FIG. 6, the expected resultant angle 606 is 85.4°, which is the resultant angle that corresponds to the first springback compensated input angle 614 according to the calibration curve 602. The first measured resultant angle 609 is 87°. As such, the difference is 1.6°. The two-step springback compensation module 128 determines an offset calibration curve 604, which is a version of the calibration curve 602 that is offset along the resultant angle axis by the difference, e.g. by 1.6° in this example. The shape of the calibration curve 602 is maintained in the offset calibration curve 604. The offset calibration curve 604 is used to find the input angle for the second bending process to be applied to the material 120. The two-step springback compensation module 128 may apply an upper correction limit 607 and a lower correction limit 608 as boundaries around the calibration curve 602 beyond which an offset calibration curve 604 is considered to be invalid. If the offset calibration curve 604 falls outside the upper correction limit 607 and the lower correction limit 608, a new calibration curve is created by the calibration module 122. The upper correction limit is set at a point of overbending the material 120 and the lower correction limit is an adjustable variable such as 5° below the calibration curve 602 along the axis of the input angle.

Figure 5:
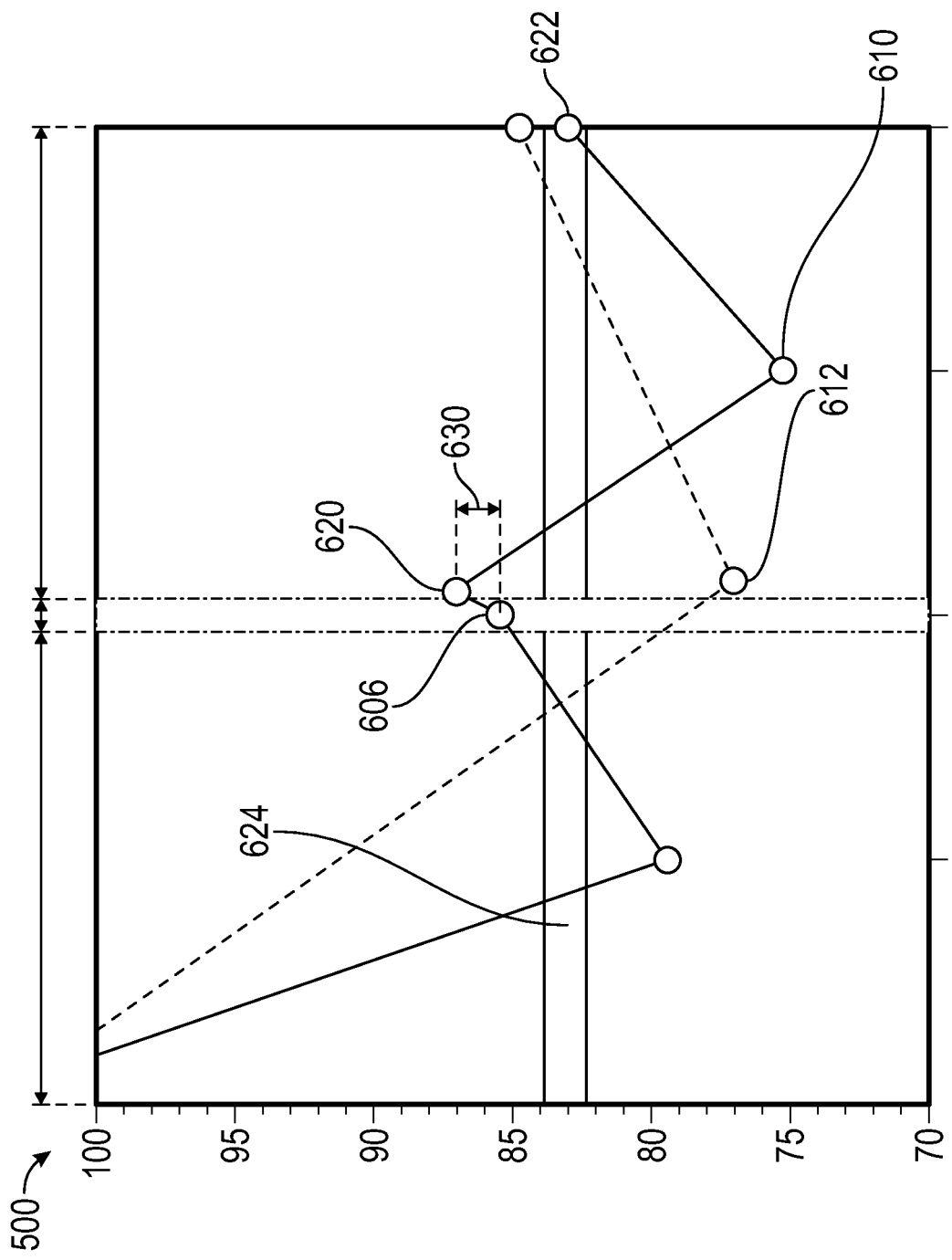
FIG. 5 is a graph showing a two-step springback compensation process, in accordance with various embodiments.

In accordance with various embodiments, the two-step springback compensation module 128 determines a second springback compensated input angle 610 that corresponds to the target resultant angle 406 according to the offset calibration curve 604. In the example of FIG. 5, the second springback compensated input angle is 75.3°. The second springback compensated input angle is used as the input angle to the bend forming tool 102, which creates a second and final bend in the material 120. Referring back to FIG. 1, the two-step springback compensation module 128 outputs two-step input angle data 142, which includes the first springback compensated input angle 614 and the second springback compensated input angle 610. The two-step input angle data 142 may be provided to the user output device 110 for display and subsequent entry into the bend forming tool via the user input device 108 or may be transmitted directly to the bend forming tool 136 by wired or wireless connection.

In FIG. 5, a bending sequence graph 500 is illustrated for a two-step bending sequence executed through the two-step springback compensation module 128. The two-step bending sequence includes a first bending step, a measurement step and a second bending step. The two-step springback compensation module 128 determines the first springback compensated input angle 614 as an underbend as compared to the calibration curve springback compensated input angle 612, which is the bend that would be required in a one-step process according to the calibration curve 602. The first springback compensated input angle 614 is input to the bend forming tool 102 to apply a bend to the material 120. This first bending step provides information as to any offset that is needed to be applied to the calibration curve 602 in order to make sure that the second bending step achieves the target resultant angle 406. A first measured resultant angle 620 is measured after the material springs back from the first bending process. A deviation 630 between the first measured resultant angle 620 and the expected resultant angle 606 (according to the calibration curve 602) is calculated. The deviation 630 is used to offset the calibration curve 602 to provide an offset calibration curve 604. The second springback compensated input angle 610 is read from the offset calibration curve 604 at the point corresponding to the target resultant angle 406. The second springback compensated input angle 610 is entered to the bend forming tool 102, which applies a second bend to the material 120. The material is bent to a final resultant angle 622, which is within the resultant angle tolerance 624.

In accordance with various embodiments, the bending process control module 136 manages the interaction between the various modules of the processing system. In one embodiment, the bending process control module 136 determines whether the first measured resultant angle 408 created by bending according to the one-step springback compensation module 126 falls within the tolerance 404. If yes, then the one-step springback compensation process is complete in a single bending step. If not, then the bending process control module 136 additionally determines whether the material 120 has been overbent. Overbending occurs when the material 120 has been bent beyond the target resultant angle 406 by an amount greater than the resultant angle tolerance 404. If the material 120 has been overbent, then it is discarded and the bending process according to the full two-step springback compensation module 128 is followed. If the material 120 is underbent, then the bending process continues by performing the second bend to the second springback compensated input angle 610 according to the offset calibration curve 604 determined by the two-step springback compensation module 128.

In accordance with various embodiments, the two-step springback compensation module 128 passes the set of data points of the first measured resultant angle 609 and the first springback compensated input angle 614 to the bending process control module 136. When a minimum number of data points have been collected (e.g. at least four), the collected data points are passed to the calibration module 122 to create a new calibration curve. The new calibration curve is stored in the database of calibration curves 106 in association with values of parameters defining the material 120 and the bending process for subsequent use by the one-step springback compensation module 126 and the two-step springback compensation module 128. In other embodiments, the calibration module 122 creates a new calibration curve by using the machine learning model described above, which outputs a predicted calibration curve based on an input vector of material variables and process variables. The machine learning model can function without actual measuring measurements of bending parameters being taken on the material.

In embodiments, the one-step springback compensation module 126 and the two-step springback compensation module 128 are independently applicable. Whilst the one-step springback compensation module 126 and the two-step springback compensation module 128 are provided in combination in the embodiment of FIG. 1, just one of these modules may be included in the processing system 104.

Figure 7A:
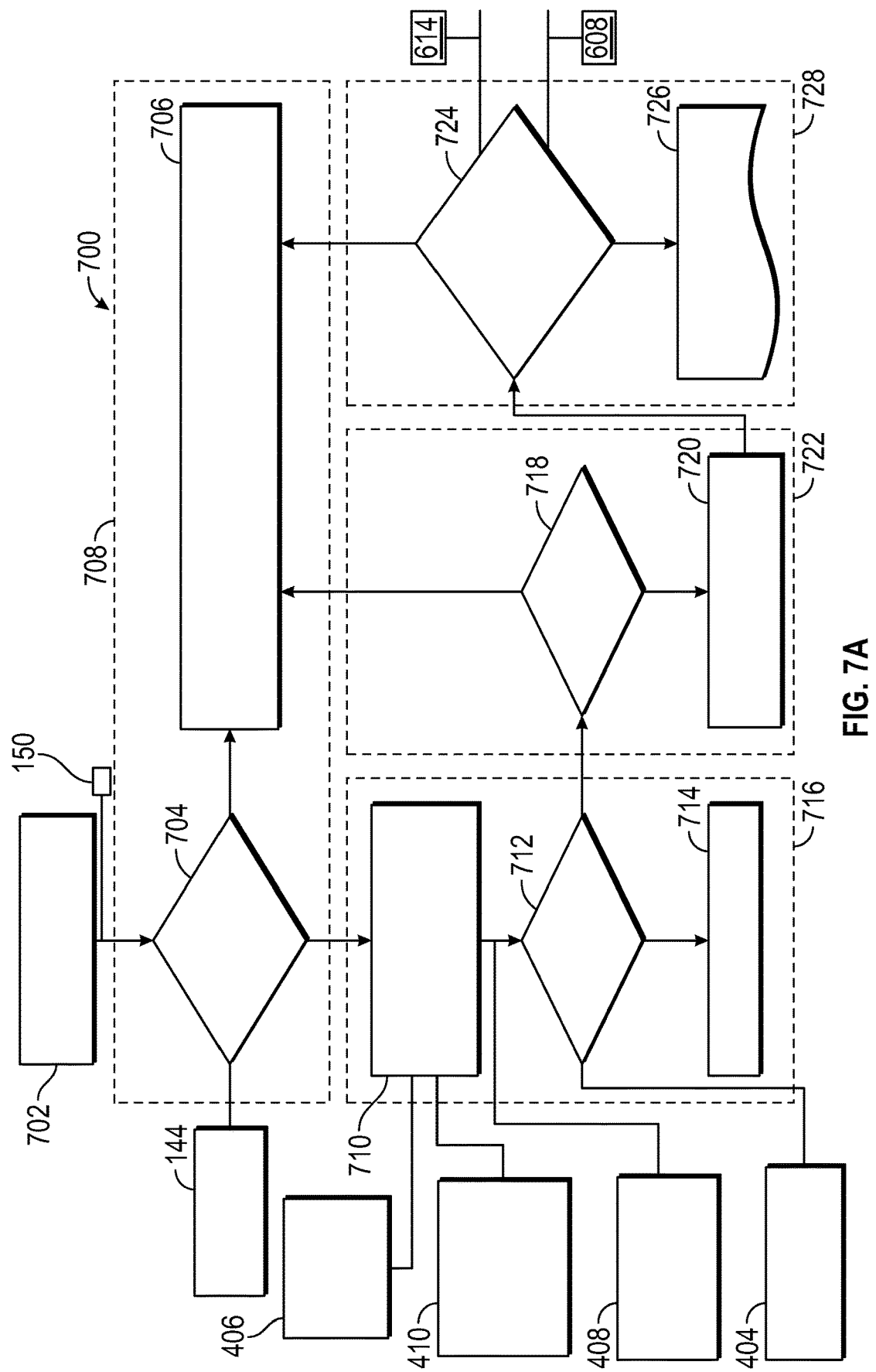
FIGS. 7A and 7B are flowcharts illustrating methods of springback compensation in bend forming processes, in accordance with various embodiments.
Figure 7B:
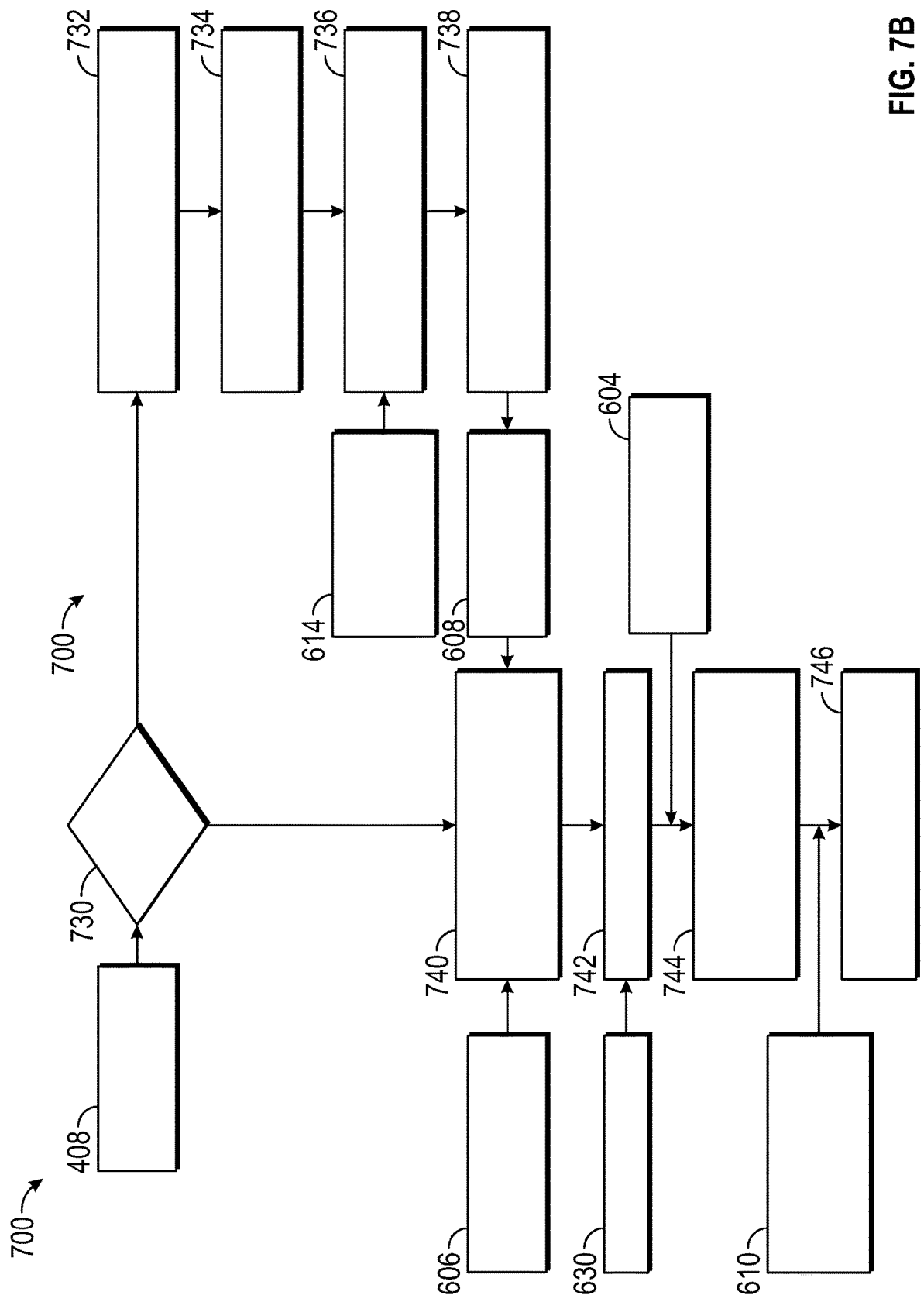

Referring now to FIGS. 7A and 7B, and with continued reference to FIGS. 1-6, flowcharts illustrate method 700 that can be performed by the system 100 described with respect to FIGS. 1 to 6 in accordance with the present disclosure. As can be appreciated in light of the disclosure, the order of operation within the method 700 is not limited to the sequential execution as illustrated in FIGS. 7A and 7B, but may be performed in one or more varying orders as applicable and in accordance with the present disclosure. The method 700 of FIGS. 7A and 7B is described taking the example of bending angle as the bending parameter but other bending parameters are applicable.

A calibration stage 708 is shown in FIG. 7A. In step 702, the material 120 and the bending process entered into (or to be entered into) the bend forming tool 102 is defined. Parameter values 150 for various parameters defining the material 120 and the bend forming process are received by the processing system 104. The parameter values 150 may be provided from an operative through the user input device 108, by digital communication from the bend forming tool 102 regarding a programmed bend forming process or a combination thereof.

In step 704, a determination is made, by the processing system 104, whether a calibration curve 602 associated with the parameter values 150 already exists. The database of calibration curves 106 is searched for the parameter values 150. If no calibration curve is found, then a new calibration curve is created in step 706. The new calibration curve is created by performing the defined bend forming process on the defined material 120 using a plurality (at least 4) of different input angles to the bend forming tool 102 and measuring each of the resultant angles. This creates a data set of input angles and corresponding resultant angles that can be used to create the calibration curve. In other embodiments, the calibration curve is predicted by inference using a machine learning modules, as described above. If a calibration curve already exists in the database of calibration curves 106, then calibration curve data 144 is provided to the processing system 104, which includes the calibration curve 202 specific to the defined material and the defined bending process.

In FIG. 7A, a one-step springback compensation stage 716 and a two-step springback compensation stage 722 are illustrated. It should be appreciated that the method 700 may move directly to the two-step springback compensation stage 722 after the calibration stage 708. The one-step springback compensation stage 716 includes a step 710 of performing a first bend on the material 120 using the bend forming tool 102. In order to do so, the first springback compensated input angle 410 is determined by the processing system 104. The processing system 104 receives a target resultant angle 406, which is the bend requested by the operative. The target resultant angle 406 may be entered by the operative through the user input device 108 or may be automatically communicated as part of a digital process specification. A point on the calibration curve 202 can be found that is aligned with the target resultant angle 406 and a corresponding first springback compensated input angle 410 can be read. Generally, the calibration curve 202 is embodied as a calibration function and the first springback compensated input angle 410 that correspond to the target resultant angle 406 is calculated from the calibration function. The first springback compensated input angle 410 may be digitally communicated to the bend forming tool 102 from the processing system 104 in one embodiment. In other embodiments, the first springback compensated input angle 410 is displayed on a user output device 110 for user input to the bend forming tool 102. The bend forming tool 102 executes the bending of the material 120 to the first springback compensated input angle 410. The resultant bend angle of the material 120 after springback is measured (either manually by an operative or using sensors of the resultant bend angle measurement device 112) and the first measured resultant angle 408 is provided to the processing system 104.

In step 712, the processing system determines whether the first measured resultant angle 408 falls within the resultant angle tolerance 404. If yes, then the bending process ends in step 714. If no, then the two-step springback compensation stage 722 is entered. In step 718, the processing system 104 determines whether a difference between the target resultant angle 406 and the first measured resultant angle 408 is within the upper and lower correction limits 607, 608. If not, then the calibration stage 708 is performed again because there is too great an error in the existing calibration curve. If so, then the two-step springback compensation process 720 is performed, which is described further with respect to FIG. 7B in the following.

In step 730 of FIG. 7B, the processing system 104 determines whether there is an overbend in the material 120, which occurs when the first measured resultant angle 408 is smaller (a tighter bend) than the target resultant angle 406 by an amount greater than the resultant angle tolerance 404. If there is an overbend, then the material 120 is discarded and replaced with new (unbent) material 120. In step 734, the first springback compensated input angle 614 is determined by the processing system 104. The first springback compensated input angle of step 734 is determined according to equation 1 and represents the input angle corresponding to a fraction of the full target resultant angle 406 (e.g. an underbend). The first springback compensated input angle 614 is entered (through a user input device 108 or digital communication from the processing system 104) to the bend forming tool 102. In step 738, the first measured resultant angle 609 is measured either by sensors of the resultant bend angle measurement device 112 or manually. If there is no overbend, then the piece of material 120 from the one-step springback compensation stage 716 is further processed. Accordingly, the first measured resultant angle 408, 608 is either measured from the material 120 bent according to the one-step springback compensation stage 716 or the new material 120 bent according to steps 734 to 738.

In step 740, the processing system 104 receives an expected resultant angle 606 that corresponds to the first springback compensated input angle 410, 614 according to the calibration curve 602. The processing system 104 determines the deviation 630 between the first measured resultant angle 408, 608 and the expected resultant angle 606 in step 740. In step 742, the calibration curve 602 is offset (whilst maintaining its form) by the deviation 630. A check may be performed that the offset calibration curve 604 falls within the upper and lower correction limits 607, 604. In step 744, the processing system 104 determines the second springback compensated input angle 610 by reading the input angle that corresponds to the target resultant angle 406 from the offset calibration curve 604. This is generally performed by embodying the offset calibration curve 604 in an offset calibration function and calculating the second springback compensated input angle 610 for the target resultant angle 406 using the offset calibration function. The second springback compensated input angle 610 may be displayed on the user output device 110 for entry into the bend forming tool 102 via the user input device 108 or may be digitally communicated to the bend forming tool 102 from the processing system 104. In step 746, the second step of bending the material 120 is performed by the bend forming tool 102 using the second springback compensated input angle 610.

Referring back to FIG. 7A, a real-time calibration stage 728 may be included that collects the first springback compensated input angle 614 and the first measured resultant angle 609 from the two-step springback compensation stage 722. In step 724, the processing system 104 determines whether there is a sufficient number of data points (greater than or equal to M, wherein M is determined based on a function used for best curve fitting (e.g., M may be at least 4 for a cubic polynomial function)). If there are enough data points, the data points are passed to the calibration stage 708 to create a new calibration curve that is stored in the database of calibration curves 106 in association with the parameter values 150 defining the material and the bending process. If not, the data points are stored in memory 132 in step 726 until enough data points are recorded. The new calibration curve can be used in subsequent bending processes.

As described herein, systems and methods realize springback compensation in bending processes that is operational when commercial springback compensation function in modern equipment is not accessible. The systems and methods collect springback data of defined materials and processes to describe a relationship between input angles to the bend forming tool and resultant bend angles via off-line and real-time calibrations. The systems and methods collect at least four data point sets of input angles to the machine and resultant bend angles. The input angles to the machine for creating the calibration data may be spread over a range of angles within the bend forming tool and material limits. The systems and methods compensate for the springback of calibrated process and material in a one-step approach where the input angle to the bend forming tool is calculated by the system by inputting a user-defined target angle into a retrieved calibration function. Springback during bend forming can also be compensated via a two-step approach which uses a self-correction algorithm. In a first step, the material is bent with a fraction of springback compensation based on a retrieved pre-determined calibration curve. If the data point deviates from the calibration curve to an extent exceeding a tolerance, a new calibration relationship is constructed by offsetting the original calibration curve to account for such deviation. A final input angle to the bend forming tool is then obtained from the new offset calibration curve and is used for a second bending step to achieve the target angle. The systems and methods complement the springback calibration database by adding data point sets of input angles to the bend forming tool and resultant angles during its usage. Resultant angle can be measured on-line or off-line, and manually or automatically. The systems and methods can be used for springback compensation of both calibrated and new materials/processes. The calibration and calculation are not limited to angle inputs and outputs. Other examples include, but are not limited to, plunging distance and/or force of the punch.

The systems and methods described herein eliminate multiple iterations of trial-and-error for individual bend angle and improve the efficiency of springback compensation. Further, accuracy of springback compensation is assured via two compensation algorithms. A corrective feedback loop is provided that enables real-time calibration and machine learning, which reduces designated off-line calibration tests. A stand-alone springback compensation system is provided. The system can also be used to supplement commercial springback compensation tools for parts with short flanges, narrower width, and additional features (cut-outs, off-sets, etc.) that impede access to such tools.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of bending a material to a target resultant bending parameter using a bend forming tool, the method comprising:
   receiving, via at least one processor, values for parameters of properties of the material and of a bending process to be performed by the bend forming tool;
   retrieving, via the at least one processor, a calibration curve relating input bending parameter and resultant bending parameter based on the values from a database of calibration curves, wherein the calibration curve is configured to compensate for differences between an input bending parameters and resultant bending parameters as a result of springback of the material, after bending of the material, due to a material properties of the material;
   determining, via the at least one processor, a first springback compensated input bending parameter based on the target resultant bending parameter using the calibration curve by calculating a difference between the target resultant bending parameter and a calibration curve springback compensated input bending parameter that corresponds to the target resultant bending parameter according to the calibration curve and adding a fraction of the difference to the calibration curve springback compensated input bending parameter to obtain the first springback compensated input bending parameter;
   inputting the first springback compensated input bending parameter to the bend forming tool;
   in a first step of bending the material, bending the material to the first springback compensated input bending parameter by applying the bending process using the bend forming tool and measuring a first measured resultant bending parameter of a bend created by the first step of bending the material after allowing springback of the material;
   determining, via the at least one processor, a deviation between the first measured resultant bending parameter and an expected resultant bending parameter that corresponds to the first springback compensated input bending parameter according to the calibration curve;
   offsetting the calibration curve based on the deviation to provide an offset calibration curve;
   determining, via the at least one processor, a second springback compensated input bending parameter based on the target resultant bending parameter using the offset calibration curve;
   inputting the second springback compensated input bending parameter to the bend forming tool; and
   in a second step of bending the material, bending the material to the second springback compensated input bending parameter by applying the bending process using the bend forming tool.

2. The method of claim 1, wherein the measuring is performed by an automated bending parameter measurement device of the bend forming tool or by a manual bending parameter measurement device.

3. The method of claim 1, comprising:
   recording, via the at least one processor, the first springback compensated input bending parameter and the first measured resultant bending parameter for each of a plurality of executions of the method of bending the material to provide M new calibration data points; and
   generating a new calibration curve based on the M new calibration data points using a best fit function, wherein the new calibration curve is to be used as the calibration curve in subsequent executions of the method of bending the material, and wherein M is determined based on the best fit function.

4. The method of claim 1, wherein:
   the method comprises determining, via the at least one processor, whether the database of calibration curves includes the calibration curve that corresponds to the values and, if not:
   the method further comprises:
   bending the material to M different the input bending parameters by applying the bending process using the bend forming tool and measuring the resultant bending parameters, wherein M is determined based on a function used for best curve fitting;
   plotting the calibration curve based on the input bending parameters and the resultant bending parameters; and
   recording the calibration curve in the database of calibration curves in association with the values.

5. The method of claim 1, comprising receiving, via the at least one processor, the target resultant bending parameter from a user input device.

6. The method of claim 1, wherein the target bending parameter is plunging distance, force of punch or bend angle.

7. The method of claim 1, wherein the bend forming tool is a press brake.

8. The method of claim 1, comprising:
   receiving, via the at least one processor, the first measured resultant bending parameter of a bend created by the first step of bending the material;
   determining whether the first measured resultant bending parameter falls within predetermined tolerance limits;
   if the first measured resultant bending parameter falls within predetermined tolerance limits, then the bending process is complete;

if the first measured resultant bending parameter falls outside the predetermined tolerance limits, the method further includes:
discarding the material if the first measured resultant bending parameter exhibits an overbend; and
if the first measured resultant bending parameter exhibits an underbend, then the method further includes:
determining, via the at least one processor, the deviation between the first measured resultant bending parameter and the expected resultant bending parameter that corresponds to the first springback compensated input bending parameter according to the calibration curve;
offsetting the calibration curve based on the deviation to provide the offset calibration curve;
determining, via the at least one processor, a second springback compensated input bending parameter based on the target resultant bending parameter using the offset calibration curve;
inputting the second springback compensated input bending parameter to the bend forming tool; and
in a second step of bending the material, bending the material to the second springback compensated input bending parameter by applying the bending process using the bend forming tool.

9. A system for bending a material to a target resultant bending parameter, the system comprising:
a bend forming tool;
at least one processor in operable communication with the bend forming tool, wherein the at least one processor is configured to execute program instructions, wherein the program instructions are configured to cause the at least one processor to:
receive values for parameters of properties of the material and of a bending process to be performed by the bend forming tool;
retrieve a calibration curve relating input bending parameter and resultant bending parameter based on the values from a database of calibration curves, wherein the calibration curve is configured to compensate for differences between input bending parameters and resultant bending parameters as a result of springback of the material, after bending of the material, due to material properties of the material;
determine a first springback compensated input bending parameter based on the target resultant bending parameter using the calibration curve and calculating a difference between the target resultant bending parameter and a calibration curve springback compensated input bending parameter that corresponds to the target resultant bending parameter according to the calibration curve and adding a fraction of the difference to the calibration curve springback compensated input bending parameter to obtain the first springback compensated input bending parameter;
in a first step of bending the material, bend the material to the first springback compensated input bending parameter by applying the bending process using the bend forming tool;
receive a first measured resultant bending parameter of a bend created by the first step of bending the material after allowing springback of the material;
determine a deviation between the first measured resultant bending parameter and an expected resultant bending parameter that corresponds to the first springback compensated input bending parameter according to the calibration curve;
offset the calibration curve based on the deviation to provide an offset calibration curve;
determine a second springback compensated input bending parameter based on the target resultant bending parameter using the offset calibration curve; and
in a second step of bending the material, bend the material to the second springback compensated input bending parameter by applying the bending process using the bend forming tool.

10. The system of claim 9, the program instructions are configured to cause the at least one processor to:
record, via the at least one processor, the first springback compensated input bending parameter and the first measured resultant bending parameter for each of a plurality of executions of bending the material by applying the bending process using the bend forming tool, to provide M new calibration data points; and
generate a new calibration curve based on the M new calibration data points, wherein the new calibration curve is to be used as the calibration curve in subsequent executions of bending the material by applying the bending process using the bend forming tool.

11. The system of claim 9, wherein the program instructions are configured to cause the at least one processor to:
determine whether the database of calibration curves includes the calibration curve that corresponds to the values and, if not:
bend the material to an M different input bending parameters by applying the bending process using the bend forming tool and measuring the resultant bending parameters;
plot the calibration curve based on the input bending parameters and the resultant bending parameters; and
record the calibration curve in the database of calibration curves in association with the values.

12. The system of claim 9, wherein the program instructions are configured to cause the at least one processor to:
receive the target resultant bending parameter from a user input device.

13. The system of claim 12, wherein the target bending parameter is plunging distance, force of punch or bend angle.

14. The method of claim 1, wherein the bend forming tool is a press brake.

* * * * *